United States Patent [19]

Parsen et al.

[11] 4,377,625

[45] Mar. 22, 1983

[54] CORROSION AND HYDROGEN EVOLUTION INHIBITORS FOR CURRENT-PRODUCING CELLS HAVING ZINC ANODES

[75] Inventors: Frank E. Parsen, Weston, Mass.; Eleanor J. Rossler, Lorne Park, Canada

[73] Assignee: Duracell Inc., Bethel, Conn.

[21] Appl. No.: 316,598

[22] Filed: Oct. 30, 1981

[51] Int. Cl.$^3$ .............................................. H01M 6/16
[52] U.S. Cl. .................................... 429/198; 429/50; 429/57; 29/623.1
[58] Field of Search .......................... 429/57, 198, 50; 29/623.1

[56] References Cited

U.S. PATENT DOCUMENTS

| | | | |
|---|---|---|---|
| 2,897,250 | 7/1959 | Klopp | 429/198 |
| 2,900,434 | 8/1959 | Zimmerman et al. | 429/198 X |
| 2,971,044 | 2/1961 | Zimmerman et al. | 429/198 X |
| 3,281,276 | 10/1966 | Schaefer | 429/198 |
| 3,281,277 | 10/1966 | Schaefer | 429/198 |
| 3,281,278 | 10/1966 | Schaefer | 429/198 |
| 3,281,279 | 10/1966 | Schaefer | 429/198 |
| 3,281,280 | 10/1966 | Schaefer | 429/198 |
| 3,281,281 | 10/1966 | Schaefer | 429/198 |
| 3,285,783 | 11/1966 | Gould | 429/198 |
| 3,291,645 | 12/1966 | Gould | 429/198 |
| 3,291,646 | 12/1966 | Gould | 429/198 |
| 3,653,965 | 4/1972 | Lee | 429/198 |
| 3,764,385 | 10/1973 | Langer, Jr. et al. | 429/194 X |
| 3,847,669 | 11/1974 | Paterniti | 429/198 X |
| 4,132,837 | 1/1979 | Soffer | 429/194 |
| 4,195,120 | 3/1980 | Rossler et al. | 429/198 X |

*Primary Examiner*—Charles F. LeFevour
*Attorney, Agent, or Firm*—Ronald S. Cornell; Israel Nissenbaum

[57] ABSTRACT

Corrosion and hydrogen evolution in a current-producing cell possessing a predominantly zinc anode and an aqueous alkaline or acidic electrolyte is significantly inhibited by the addition to said cell of a zinc corrosion and hydrogen evolution-inhibiting amount of at least one chelating agent selected from the group consisting of aminocarboxylic acid, polyamine and aminoalcohol.

14 Claims, No Drawings

CORROSION AND HYDROGEN EVOLUTION INHIBITORS FOR CURRENT-PRODUCING CELLS HAVING ZINC ANODES

FIELD OF THE INVENTION

This invention relates to electrochemical cells having zinc anodes, and particularly to primary or secondary cells having zinc anodes and alkaline or acidic electrolytes, and provides an amine-containing gassing inhibitor to inhibit or preclude hydrogen evolution within such cells.

BACKGROUND OF THE INVENTION

Alkaline and acidic cells, which may be operated either as cells or incorporated in batteries, and being either primary or secondary types, have been known for a considerable period of time. Such cells generally have zinc as the major anode component, usually in the form of a zinc amalgam powder or screen, but may have other anodes such as, for example, cadmium. Such cells may also have a variety of cathode depolarizers, such as silver oxide, mercuric oxide, manganese dioxide, nickel oxide, air, etc.; and may, as noted, be primary or secondary.

A common feature of such cells is that they have an alkaline electrolyte comprising an aqueous solution of an alkali metal or ammonium hydroxide such as sodium hydroxide, potassium hydroxide, lithium hydroxide, or the like or an acid electrolyte such as hydrochloric acid or sulfuric acid. In any event, the cell is retained in a conductive container or can which has a positive terminal electrically associated with the cathode and a negative terminal electrically associated with the anode; the positive and negative terminals being electrically insulated from each other. The separator may comprise one or more than one layer, at least one of which is an electrolyte absorbent separator and another of which may be an ionically conductive barrier layer. The positive and negative terminals are electrically insulated one from the other by a grommet or insulating sleeve, and the cell is generally sealed or closed by crimping, tooling or swaging.

Various adjuvants may be included in such cells. For example, the anode mixture may have up to 10% by weight of mercury and up to 3% by weight of a gelling agent or thickening agent of the sort generally used for alkaline electrolytes, (for example carboxymethyl cellulose) together with zinc powder. Similarly, there may be up to 8% zinc oxide dissolved in the electrolyte. The separator may comprise a cellulosic or other electrolyte permeable polymer material. Depending on the size of the cell, and the nature of the system in which it is used, the anode may be placed in the cell in the form of a pellet or a gel, or poured into a cavity containing electrolyte.

The corrosion of zinc and zinc alloys in aqueous electrolyte solutions can produce considerable quantities of hydrogen by the following reactions:

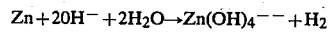

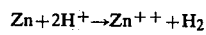

At standard temperature and pressure, the dissolution of 1 g of zinc produces 343 cm³ of hydrogen in this way. During storage, hydrogen produced as a result of the foregoing reactions can give rise to considerable pressures in the cells; the corrosion itself also causes losses in electrical energy.

Suppression of zinc corrosion can be achieved by amalgamating zinc with up to 10% of mercury, and by dissolving zinc oxide in alkaline electrolytes or zinc salts in acidic electrolytes. The use of corrosion and hydrogen evolution inhibitors in primary and secondary cells possessing zinc or zinc alloy anodes is also known. The following materials have been proposed for use as inhibitors: 8-nitro quinoline and 8-chloro quinoline (U.S. Pat. No. 2,897,250 to Klopp); non-ionic surface active agents of the formula R-O(R')n-R'' where R is alkyl, aryl or aralkyl, R'' is hydrogen or similar to R, R' is an alkoxy radical such as ethoxy or propoxy and n is 1 to 50 (U.S. Pat. Nos. 2,900,434 and 2,971,044 to Zimmerman, et al.); surface active heteropolar substances (U.S. Pat. No. 3,057,944 to Ruetschi, et al.) paradicyclohexylbenzene (U.S. Pat. No. 3,281,276 to Schaefer); triphenylchloromethane and 1-chloro-3-fluorobenzene (U.S. Pat. No. 3,281,277 to Schaefer); terephthalic acid and 4-biphenylcarboxylic acid (U.S. Pat. No. 3,281,278 to Schaefer); benzyl tert-butanol (U.S. Pat. No. 3,281,279 to Schaefer); 4-biphenylcarbonitrile (U.S. Pat. No. 3,281,280 to Schaefer); N,N-diethylcarbanilide (U.S. Pat. No. 3,281,281 to Schaefer); compounds of the formula $RNH(OR_1)PO(ONH_3R_2)$ wherein R is an aliphatic hydrocarbon radical of 12-18 carbon atoms, $R_1$ is an aliphatic hydrocarbon radical of 1-10 carbon atoms and $R_2$ is an aliphatic hydrocarbon radical of 12-18 carbon atoms (U.S. Pat. No. 3,285,783 to Gould); compounds of the formula $RSO_2NHCH_2COOM$ wherein R is an aliphatic hydrocarbon radical of 8-20 carbon atoms and M is an alkali metal (U.S. Pat. No. 3,291,645 to Gould); $RNH_2$ wherein R is an aliphatic hydrocarbon radical of 16-18 carbon atoms (U.S. Pat. No. 3,291,646 to Gould); tridecyloxypoly(ethyleneoxy)ethanol (U.S. Pat. No. 3,348,973 to Dirkse); ethylene oxide polymer and various derivatives thereof (U.S. Pat. Nos. 3,653,965 to Lee and 3,847,669 to Paterniti); saturated or unsaturated monocarboxylic acid containing at least two ethanolamide radicals (U.S. Pat. No. 3,963,520 to Bauer, et al.); and, complex phosphate esters of surfactants of the ethylene oxide-adduct type (U.S. Pat. No. 4,195,120 to Rossler, et al.).

U.S. Pat. No. 3,764,385 to Langer, Jr., et al. discloses a battery, possibly containing a zinc electrode, which employs a charge transfer agent based on a lithium salt which has been complexed with a non-chelating or chelating compound. No mention whatever is made in Langer, Jr. of inhibiting corrosion and hydrogen gas evolution in a battery containing a zinc or zinc alloy anode and an aqueous alkaline or acidic electrolyte.

U.S. Pat. No. 4,132,837 to Soffer discloses a light metal anode battery, i.e., one employing a highly reactive metal such as lithium as the anode, in which the non-aqueous electrode component contains one or more macrocyclic complexing agents at least some of which may be considered chelating agents.

There is lacking in the foregoing prior patents any recognition or suggestion that certain amine-containing chelating agents as hereinafter defined will effectively protect zinc or zinc alloy anodes from corrosion and suppress hydrogen evolution in alkaline or acidic galvanic cells possessing such anodes.

It is a particular object of this invention to provide a group of organic complexing agents of metal ions, which, when present in small quantity in the electrolyte, retards still further the corrosion of zinc amalgam in electrolytes containing dissolved zincates or zinc salts.

It is another object of the invention to provide a group of substances which, when added to the electrolyte, provides high protective strength to zinc electrodes in galvanic cells while not decreasing the electrochemical performance of said cells at high rate and low temperature discharges.

It is a further object of this invention to prevent evolution of large volumes of hydrogen within a zinc containing cell, thereby preserving the structural integrity of cells during storage.

It is still a further object of this invention to prevent losses in the electrical energy of cells during storage.

SUMMARY OF THE INVENTION

In accordance with the present invention, corrosion and hydrogen evolution in a current-producing cell possessing a zinc or zinc alloy anode and an aqueous alkaline or acidic electrolyte is significantly inhibited by the addition to said cell of a zinc corrosion and hydrogen evolution-inhibiting amount of at least one chelating agent selected from the group consisting of aminocarboxylic acid chelating agent, polyamine chelating agent and aminoalcohol chelating agent.

DESCRIPTION OF THE PREFERRED EMBODIMENTS

The term "chelating agent" as used herein is to be taken in its art-recognized sense as defining "a compound containing donor atoms that can combine by coordinate bonding with a single metal atom to form a cyclic structure called a chelation complex, or, simply, a chelate" (Kirk-Othmer, *Encyclopedia of Chemical Technology*, Third Ed., Vol. 5, p. 339, (1979) John Wiley & Sons, Inc.). Representative of useful chelating agents herein are aminocarboxylic acids such as N-hydroxyethethylenediaminetriacetic acid, diethylenetriaminepentaacetic acid, ethylenediaminetetraacetic acid, ethylene glycol-bis-($\beta$-aminoethylether)-N,N$^1$-tetraacetic acid, ethyletherdiaminetetraacetic acid, 1-methylethylenediaminetetraacetic acid (or 1,2-propylenediaminetetraacetic acid), nitrilotriacetic acid; N-dihydroxyethylglycine, and ethylenebis(hydroxyphenylglycine); polyamines such as ethylenediamine, triethylenetetramine and triaminoethylamine; and, aminoalcohols such as triethanolamine and N-hydroxyethylethylenediamine. Numerous other chelating agents of the foregoing classes can also be used herein with good results.

The chelating agents can be added to the anode or cathode mixture, incorporated in the electrolyte at the time that the electrolyte is charged into the cell, or incorporated in the separator by pre-wetting or impregnating the separator with the additive. In all events, however, it has been found that the incorporation of a chelating agent in a cell in an amount of from 0.001% to 5%, preferably 0.005 to 1% and most preferably 0.01 to 0.3% by weight of the active anode component of the cell, can preclude or at least significantly inhibit the evolution of hydrogen within the cell and thereby increase its shelf life and its useful work life.

The electrolyte can be alkaline, e.g., of a pH greater than about 9, or acidic, e.g., a pH less than about 5.

The following examples are further illustrative of this invention.

EXAMPLES 1-6

Zinc amalgam anodes (Zn, 96% by weight; Hg, 4% by weight) were pressed from granules sieved through 60° mesh and retained on 100 mesh (ASTM). The aqueous electrolyte was comprised of KOH, 38.5% by weight, and ZnO, 4.5% by weight. The temperature of the corrosion test was 55° C. The table below sets forth the results of the corrosion tests for a number of aminocarboxylic acid chelating agents ("inhibitors") added to the electrolyte and are given as retardation coefficients and protective strengths. The retardation coefficient is defined as the ratio of volumes of hydrogen evolved in the absence and presence of the inhibitor. The protective strength is equal to the relative decrease of corrosion rate caused by the inhibitor. Protective strength is expressed as percentage decrease in the gassing rate.

TABLE

| Inhibitor | Concentration of Inhibitor | Retardation Coefficient | Protective Strength |
|---|---|---|---|
| N—hydroxyethethylenediaminetriacetic acid | 0.1% | 4.55 | 78% |
| Diethylenetriaminepentaacetic acid | 0.1% | 5.00 | 80% |
| Ethylenediaminetetraacetic acid | 0.1% | 4.16 | 76% |
| Ethylene glycol-bis-($\beta$-aminoethylether)-N,N$^1$—tetraacetic acid | 0.1% | 4.16 | 76% |
| Ethyletherdiaminetetraacetic acid | 0.1% | 4.00 | 75% |
| 1-methylethylenediaminetetraacetic acid (or 1,2-propylenediaminetetraacetic acid) | 0.1% | 3.33 | 70% |

The examples given above have been for purposes of illustration of the invention and its applicability, and are not intended to be restrictive to the scope of the invention which is more particularly defined in the appended claims.

What is claimed is:

1. A current-producing cell having a cathode, an anode, an electrolyte selected from the group consisting of an alkaline electrolyte having a pH greater than about 9 and an acidic electrolyte having a pH less than about 5 and at least one electrolyte-carrying separator disposed between said cathode and said anode, the combination being retained in a conductive container having a positive terminal electrically associated with said cathode and a negative terminal electrically associated with said anode, said terminals being electrically insulated from each other, said anode being predominantly zinc; and said cell having therein a corrosion and hydrogen evolution-inhibiting amount of at least one chelating agent selected from the group consisting of aminocarboxylic acid, polyamine and aminoalcohol.

2. The current-producing cell of claim 1 wherein the chelating agent is present in an amount of from about 0.001% to about 5% by weight of the zinc component of said cell.

3. The cell of claim 1 wherein the chelating agent is present in an amount of from about 0.01% to about 0.3% by weight of zinc.

4. The cell of claim 1 wherein the chelating agent is admixed with zinc amalgam powder to form said anode.

5. The cell of claim 1 wherein the chelating agent is at least one aminocarboxylic acid chelating agent selected from the group consisting of N-hydroxyethethylenediaminetriacetic acid; diethylenetriaminepentaacetic acid; ethylenediaminetetraacetic acid; ethylene glycol-bis-($\beta$-aminoethylether)-N,N$^1$-tetraacetic acid; ethyletherdiaminetetraacetic acid; 1-methylethylenediaminetetraacetic acid; nitrilotriacetic acid; N-dihydroxyethylglycine; and, ethylenebis(hydroxyphenylglycine).

6. The cell of claim 1 wherein the chelating agent is at least one polyamine selected from the group consisting of ethylenediamine, triethylenetetraamine and triaminotriethylene.

7. The cell of claim 1 wherein the chelating agent is at least one aminoalcohol selected from the group consisting of triethanolamine and N-hydroxyethylenediamine.

8. A process for inhibiting zinc corrosion and hydrogen evolution in a current-producing cell which has a cathode, a predominantly zinc anode, an electrolyte selected from the group consisting of an alkaline electrolyte having a pH greater than about 9 and an acidic electrolyte having a pH less than about 5, and at least one electrolyte-carrying separator comprising incorporating in said cell a zinc corrosion and hydrogen evolution-inhibiting amount of at least one chelating agent selected from the group consisting of aminocarboxylic acid, polyamine and aminoalcohol.

9. The process of claim 8 wherein the chelating agent is present in an amount of from about 0.001% to about 5% by weight of the zinc component of said cell.

10. The process of claim 8 wherein the chelating agent is present in an amount of from about 0.01% to about 0.3% by weight of zinc.

11. The process of claim 8 wherein the chelating agent is admixed with zinc amalgam powder to form said anode.

12. The process of claim 8 wherein the chelating agent is at least one aminocarboxylic acid chelating agent selected from the group consisting of N-hydroxyethethylenediaminetriacetic acid; diethylenetriaminepentaacetic acid; ethylenediaminetetraacetic acid; ethylene glycol-bis-($\beta$-aminoethylether)-N,N$^1$-tetraacetic acid; ethyletherdiaminetetraacetic acid; 1-methylethylenediaminetetraacetic acid nitrilotriacetic acid; N-dihydroxyethylglycine; and, ethylenebis(hydroxyphenylglycine).

13. The process of claim 8 wherein the chelating agent is at least one polyamine selected from the group consisting of ethylenediamine, triethylenetetraamine and triaminotriethylene.

14. The process of claim 8 wherein the chelating agent is at least one aminoalcohol selected from the group consisting of triethanolamine and N-hydroxyethylenediamine.

* * * * *